(12) United States Patent
Kang

(10) Patent No.: US 11,516,647 B2
(45) Date of Patent: Nov. 29, 2022

(54) UE REACHABILITY MANAGEMENT METHOD, CORE NETWORK, AND ACCESS NETWORK

(71) Applicant: VIVO MOBILE COMMUNICATION CO., LTD., Chang'an Dongguan (CN)

(72) Inventor: Yanchao Kang, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 134 days.

(21) Appl. No.: 16/639,429

(22) PCT Filed: Aug. 9, 2018

(86) PCT No.: PCT/CN2018/099569
§ 371 (c)(1),
(2) Date: Feb. 14, 2020

(87) PCT Pub. No.: WO2019/033981
PCT Pub. Date: Feb. 21, 2019

(65) Prior Publication Data
US 2021/0136557 A1 May 6, 2021

(30) Foreign Application Priority Data
Aug. 15, 2017 (CN) .......................... 201710698560.2

(51) Int. Cl.
| H04W 4/00 | (2018.01) |
| H04W 8/02 | (2009.01) |
| H04W 76/27 | (2018.01) |
| H04W 48/16 | (2009.01) |
| H04W 88/06 | (2009.01) |

(52) U.S. Cl.
CPC ............. *H04W 8/02* (2013.01); *H04W 48/16* (2013.01); *H04W 76/27* (2018.02); *H04W 88/06* (2013.01)

(58) Field of Classification Search
CPC ....... H04W 8/02; H04W 76/27; H04W 48/16; H04W 88/06
USPC ......................................................... 370/329
See application file for complete search history.

(56) References Cited

U.S. PATENT DOCUMENTS

| | | | | |
|---|---|---|---|---|
| 10,111,190 | B2 * | 10/2018 | Pelletier | H04W 52/246 |
| 10,264,622 | B2 * | 4/2019 | Park | H04W 74/0833 |
| 10,349,380 | B2 * | 7/2019 | Park | H04W 76/27 |
| 10,349,440 | B2 * | 7/2019 | Ozturk | H04W 72/14 |
| 10,368,334 | B2 * | 7/2019 | Park | H04W 68/04 |
| 10,595,167 | B2 * | 3/2020 | Chen | H04W 76/40 |
| 10,708,884 | B2 * | 7/2020 | Lee | H04W 74/0833 |
| 10,750,380 | B2 * | 8/2020 | Fujishiro | H04W 24/02 |
| 10,757,621 | B2 * | 8/2020 | Park | H04W 36/26 |
| 10,764,861 | B2 * | 9/2020 | Ishii | H04W 68/005 |
| 10,863,394 | B2 * | 12/2020 | Kim | H04W 76/27 |
| 10,904,858 | B2 * | 1/2021 | Lee | H04W 76/27 |
| 10,952,088 | B2 * | 3/2021 | Ryu | H04W 24/10 |
| 10,952,107 | B2 * | 3/2021 | Lee | H04W 36/0055 |

(Continued)

*Primary Examiner* — Marceau Milord

(74) *Attorney, Agent, or Firm* — von Briesen & Roper, s.c.

(57) ABSTRACT

A UE reachability management method, a core network and an access network are provided. The method includes: transmitting a request message for requesting UE reachability information to an access network in a case that a UE supports a radio resource control (RRC) inactive state; receiving the UE reachability information fed back by the access network according to the request message.

13 Claims, 3 Drawing Sheets

Receiving a request message transmitted by an Access and Mobility Management Function (AMF) entity of a core network for requesting UE reachability information — 41

Feeding back the corresponding UE reachability information to the AMF entity according to the request message — 42

(56) References Cited

U.S. PATENT DOCUMENTS

| | | | |
|---|---|---|---|
| 10,986,485 B2* | 4/2021 | Kim | H04W 76/27 |
| 10,986,655 B2* | 4/2021 | Ryoo | H04W 72/1284 |
| 11,039,377 B2* | 6/2021 | Lee | H04W 88/023 |
| 11,083,040 B2* | 8/2021 | Mildh | H04W 36/0033 |
| 11,129,228 B2* | 9/2021 | Byun | H04W 76/11 |
| 11,240,866 B2* | 2/2022 | Zhang | H04W 76/38 |
| 2018/0213452 A1* | 7/2018 | Kim | H04L 5/0053 |
| 2018/0270713 A1* | 9/2018 | Park | H04L 5/0053 |
| 2018/0270791 A1* | 9/2018 | Park | H04W 76/27 |
| 2018/0270792 A1* | 9/2018 | Park | H04W 68/025 |
| 2018/0270894 A1* | 9/2018 | Park | H04W 92/20 |
| 2018/0270895 A1* | 9/2018 | Park | H04W 8/005 |
| 2018/0279193 A1* | 9/2018 | Park | H04W 36/08 |
| 2018/0279204 A1* | 9/2018 | Kim | H04W 52/0229 |
| 2018/0279229 A1* | 9/2018 | Dinan | H04W 52/367 |
| 2019/0053319 A1* | 2/2019 | Jeon | H04L 5/0098 |
| 2019/0357295 A1* | 11/2019 | Kim | H04L 5/0053 |
| 2019/0394698 A1* | 12/2019 | Jeong | H04W 36/0061 |
| 2020/0128420 A1* | 4/2020 | Ryu | H04W 76/27 |
| 2020/0145921 A1* | 5/2020 | Zhang | H04W 76/27 |
| 2020/0178204 A1* | 6/2020 | Chen | H04W 68/005 |
| 2020/0221526 A1* | 7/2020 | Jin | H04W 76/15 |
| 2020/0359191 A1* | 11/2020 | Rugeland | H04W 76/27 |
| 2021/0006968 A1* | 1/2021 | Tenny | H04L 63/123 |
| 2021/0092668 A1* | 3/2021 | Zaus | H04W 48/02 |
| 2021/0112591 A1* | 4/2021 | Lee | H04W 74/0833 |
| 2021/0120463 A1* | 4/2021 | Kim | H04L 5/0091 |

* cited by examiner

UE REACHABILITY MANAGEMENT METHOD, CORE NETWORK, AND ACCESS NETWORK

CROSS-REFERENCE TO RELATED APPLICATION

This application is the U.S. national phase of PCT Application PCT/CN2018/099569 filed on Aug. 9, 2018, which claims priority to Chinese Patent Application No. 201710698560.2, filed on Aug. 15, 2017, which is incorporated herein by reference in its entirety.

TECHNICAL FIELD

The present disclosure relates to the field of communication technology, and in particular to a UE reachability management method, a core network, and an access network.

BACKGROUND

Before a network device initiates communication to a user equipment (UE), whether the UE is reachable is detected firstly, which may be achieved by obtaining UE reachability management information. Specifically, a network element entity required to obtain the UE reachability management information includes: a network element function (NEF) entity with a Unified Data Management (UDM) function and a Short Message Service-Service Center (SMS-SC) entity, etc. Specifically, in a case that the UE is in or enters a connected management connected (CM-Connected) state, the network element entity required to obtain the UE reachability management information requests an Access and Mobility Management Function (AMF) entity to notify a network element entity of the connected state of the UE through a process for requesting reachability management of the UE, so that the network element entity required to obtain the UE reachability management information transmits control information or service information to the UE.

Specifically, the network element entity requests the UE reachability management information from a Unified Data Management (UDM) entity, and performs authorization check through the UDM entity. The UDM entity transmits a reachability notification request message or an equivalent Service based architecture (SBA) message to the AMF entity, to request the AMF entity to notify the UDM entity after the AMF entity acquires the UE reachability management information, or to notify the UDM entity of a network function (NF) carried in a notification request message. The AMF entity obtains the UE reachability management information by receiving a registration request message or a service request message of the UE. After receiving the registration request message or the service request message of the UE, the AMF entity notifies the UDM entity or other NFs that the UE is reachable.

Further, for a UE in an idle state, the AMF entity waits for non-access stratum (NAS) signaling in a case that the UE enters a CM-Connected state next time. For a UE in a CM-Connected state, the AMF entity does not know whether the UE is currently in a radio resource control connected (RRC-Connected) state or in an RRC-Inactive state. After receiving a request for UE reachability management information from other network element entities, the AMF entity will return reachability feedback information of the UE, so that other network element entities initiate signaling or service data to the UE, triggering an access network to initiate a paging process to the UE in the RRC-Inactive state. In other words, since the AMF entity cannot determine whether the UE in the CM-Connected state is in the RRC-Connected state or in the RRC-Inactive state, in a case that the UE is in the RRC-Inactive state, the AMF entity will still feedback the reachable feedback information of the UE to other network element entities, such that other network element entities directly initiate signaling or data processes to the UE, as a result, a radio access network (RAN) triggers a paging process, which increases a burden on the network air interface resources and energy consumption on the UE side.

SUMMARY

In a first aspect, a UE reachability management method is provided by an embodiment of the present disclosure, which is applied to an Access and Mobility Management Function (AMF) entity of a core network and includes:

transmitting a request message for requesting UE reachability information to an access network in a case that a UE supports a radio resource control inactive (RRC-Inactive) state;

receiving the UE reachability information fed back by the access network according to the request message.

In a second aspect, a core network is further provided by an embodiment of the present disclosure, including:

an Access and Mobility Management Function (AMF) entity;

a first transmission module, configured to transmit a request message for requesting UE reachability information to an access network in a case that a UE supports a radio resource control inactive (RRC-Inactive) state;

a first reception module, configured to receive the UE reachability information fed back by the access network according to the request message.

In a third aspect, an access network is provided by an embodiment of the present disclosure, including a storage and a processor, wherein a computer program executable by the processor is stored in the storage, and the computer program is executed by the processor to perform the UE reachability management method described as above.

In a fourth aspect, an embodiment of the present disclosure provides a computer readable storage medium, and a computer program is stored in the computer readable storage medium, where the computer program is executed by a processor to perform the UE reachability management method described as above.

In a fifth aspect, a UE reachability management method is provided by an embodiment of the present disclosure, which is applied to an access network and includes:

receiving a request message transmitted by an Access and Mobility Management Function (AMF) entity of a core network for requesting UE reachability information;

feeding back the corresponding UE reachability information to the AMF entity according to the request message.

In a sixth aspect, an access network is further provided by an embodiment of the present disclosure, including:

a fourth reception module, configured to receive a request message transmitted by an Access and Mobility Management Function (AMF) entity of a core network for requesting UE reachability information;

a second transmission module, configured to feed back the corresponding UE reachability information to the AMF entity according to the request message.

In a seventh aspect, an access network is provided by an embodiment of the present disclosure, including a storage and a processor, where a computer program executable by the processor is stored in the storage, and the computer program is executed by the processor to perform the UE reachability management method described as above.

In an eighth aspect, an embodiment of the present disclosure provides a computer readable storage medium, and a computer program is stored in the computer readable storage medium, where the computer program is executed by a processor to perform the UE reachability management method described as above.

BRIEF DESCRIPTION OF THE DRAWINGS

In order to more clearly illustrate the technical solutions in embodiments of the present disclosure, the drawings used in the description of the embodiments of the present disclosure will be briefly introduced below. Obviously, the drawings in the following description are only some embodiments of the present disclosure. Based on these drawings, other drawings may be obtained by those skilled in the art without any creative work.

DETAILED DESCRIPTION

Figure 1:
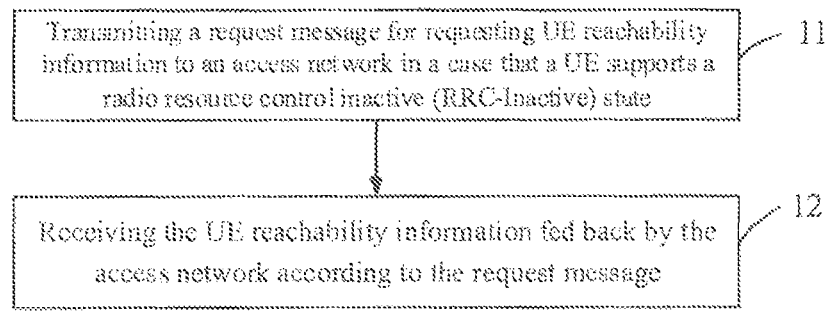
FIG. 1 is a schematic flowchart illustrating a UE reachability management method on a core network side according to an embodiment of the present disclosure.

Exemplary embodiments of the present disclosure will be described in more detail below with reference to the accompanying drawings. Although exemplary embodiments of the present disclosure are shown in the drawings, it should be understood that the present disclosure may be implemented in various forms and should not be limited by the embodiments described herein. Rather, these embodiments are provided so that this disclosure will be thorough and complete, and will fully convey the scope of the disclosure to those skilled in the art.

The terms "first", "second", and the like in the specification and claims of the present application are used to distinguish similar objects, and are not necessarily used to describe a particular order or chronological order. It is to be understood that the data so used may be interchangeable under appropriate circumstances, so that the embodiments of the present application described herein can be implemented in a sequence other than those illustrated or described herein. In addition, the terms "comprise" and "have" and any variants thereof are intended to cover non-exclusive inclusions, for example, a process, method, a system, a product, or a device that includes a series of steps or units is not necessarily limited to those steps or units clearly listed, but may include other steps or units not explicitly listed or inherent to such processes, methods, products or devices.

An embodiment of the present disclosure provides a UE reachability management method applied to an Access and Mobility Management Function (AMF) entity of a core network. Specifically, as shown in FIG. 1, the method includes the following steps:

Step 11: transmitting a request message for requesting UE reachability information to an access network in a case that a UE supports a radio resource control inactive (RRC-Inactive) state.

In a 5G mobile communication system, the UE has an RRC-Connected state and an RRC-Inactive state. Since the UE is in the RRC-Connected state or the RRC-Inactive state, the AMF entity considers the UE to be in a CM-Connected state. In a case that the UE supports the RRC-Inactive state, if the AMF entity needs to know the accurate connection state of the UE, the AMF entity needs to transmit a request message for requesting User Equipment (UE) reachability information to the access network.

Step 12: receiving the UE reachability information fed back by the access network according to the request message.

After receiving the request message transmitted by the AMF entity of the core network, the access network feeds back the corresponding UE reachability information to the core network. The UE reachability information is configured to indicate whether the UE is reachable.

Specifically, Step 11 may be implemented by the following step: transmitting the request message for requesting the UE reachability information to the access network in a case that the AMF entity detected that the UE is in a connected management connected (CM-Connected) state. Since the UE is in an RRC-Idle state in a case that the UE is in a CM-IDLE state, the AMF entity transmits the request message for requesting the UE reachability information to the access network only in a case that the AMF entity detected that the UE is in the CM-Connected state. That is, in a case that the UE supports the RRC-Inactive state, if the AMF entity needs to accurately know whether the UE is reachable, the AMF entity must first detect whether the UE is in the CM-IDLE state or the CM-Connected state. In a case that the AMF entity detected that the UE is in the CM-IDLE state, the AMF entity may determine that the UE is also in the RRC-Idle state, and the UE is unreachable; In a case that the AMF entity detected that the UE is in the CM-Connected state, the AMF entity may not determine whether the UE is in the RRC-Connected state or the RRC-Inactive state, and therefore the AMF entity needs to transmit a request message for requesting the UE reachability information to the access network.

The above mentioned AMF entity transmits the request message to the access network in a case that accurate UE reachability information is required. The accurate UE reachability information required by the AMF entity refers to the fact that the AMF entity receives the request message transmitted by other network element entities of the core network (such as a UDM entity or an SMSF entity, etc.) for requesting the UE reachability information. That is, Step 11 specifically includes: transmitting the request message for requesting the UE reachability information to the access network in a case that the AMF detected that other network element entity of the core network requests the UE reachability information and the UE is in the connected management connected (CM-Connected) state. The other network element entity is a network element entity other than the AMF entity in the core network.

Specifically, Step 12 specifically includes: receiving the UE reachability information fed back by the access network, where the UE reachability information is configured to indicate that the UE is in an RRC-Connected state. In other words, in a case that the core network needs to know the accurate UE reachability information, the core network transmits a corresponding request message to the access network. After the access network receives the request message, in a case that the UE is in an RRC-Connected state, the access network feeds back, to the core network, the UE reachability information configured to indicate that the UE is in the RRC-Connected state.

Further, the step of receiving the UE reachability information fed back by the access network and configured to indicate that the UE is in the RRC-Connected state includes: receiving the UE reachability information that is fed back by the access network after the access network detects that the UE transitions from the RRC-Inactive state to the RRC-Connected state. That is, in a case that the UE is currently in the RRC-Inactive state, the access network does not feed back to the core network until it is detected that the UE transitions from the RRC-Inactive state to an RRC-Connected state, the access network feeds back, to the core network, the UE reachability information configured to indicate the UE is in the RRC-Connected state. In a case that it is known that the UE is in the RRC-Connected state, the core network feeds back UE reachability indication information to other network element entities requesting the UE reachability information. In a case that feedback information of the access network is not received, the core network determines that the UE is unreachable, and does not request feed back to other network element entities requesting the UE reachability information. In this way, other network element entities of the core network will not initiate data transmission or service transmission to the UE and will not trigger the access network to initiate a paging request to the UE until they have received the UE reachability indication information, which effectively reduces air interface signaling and unnecessary power consumption of the RRC-Inactive UE.

Further, the AMF entity requests the access network for the accurate UE reachability information only in a case that the UE supports the RRC-Inactive state. Prior to Step 11, the UE reachability management method of the present disclosure further includes: detecting whether the UE supports the RRC-Inactive state, which may be implemented in the following manners.

Manner 1: receiving, through a non-access stratum (NAS) message, capability indication information configured to indicate whether the UE supports the RRC-Inactive state; performing the step of transmitting the request message for requesting the UE reachability information to the access network in a case that the capability indication information indicates that the UE supports the RRC-Inactive state.

Figure 2:
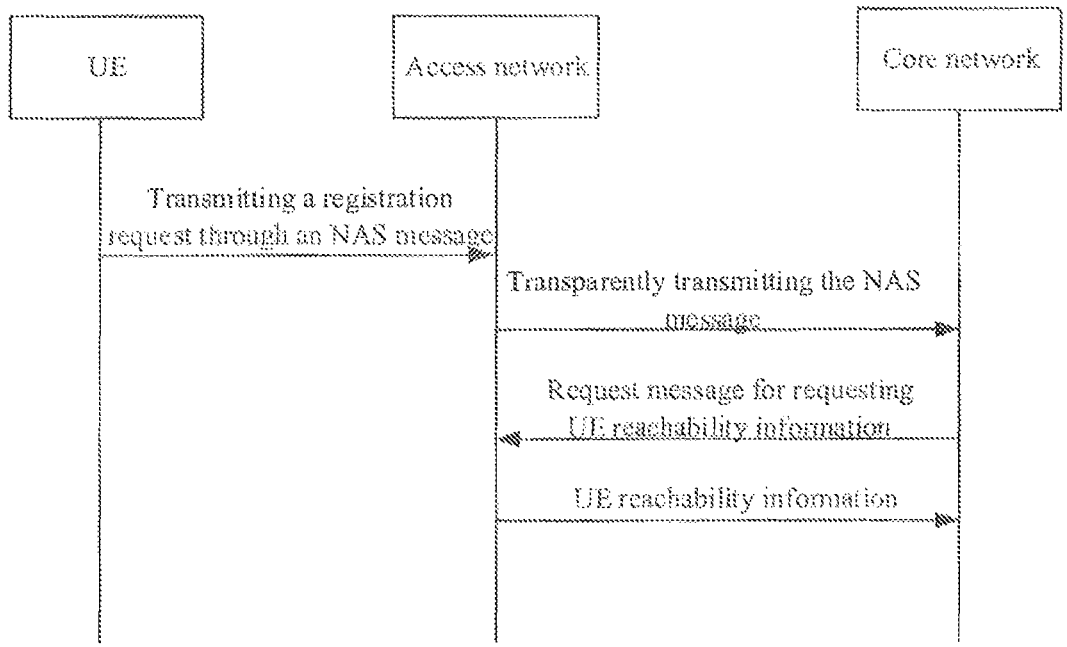
FIG. 2 is a schematic flowchart illustrating a UE reachability management method according to an embodiment of the present disclosure.

Specifically, the UE provides the AMF entity with the capability indication information of supporting the RRC-Inactive state during a registration process. As shown in FIG. 2, the UE transmits a registration request to the access network through an NAS message on an N1 interface, and then transparently transmits it to the AMF entity of the core network via the access network. The UE carries UE capability information in the registration request, and the UE capability information carries the capability indication information configured to indicate whether the UE supports the RRC-Inactive state. Specifically, the capability indication information may be carried in the function information element (Capability IE (Information Element)) of the UE.

Manner 2: receiving information transmitted by the access network for activating the RRC-Inactive state; transmitting the request message for requesting the UE reachability information to the access network according to the information.

The RRC-Inactive state may be configured based on network. Specifically, the AMF entity may provide RRC Inactive assistance information to the access network to assist the access network in deciding whether to adopt the RRC-Inactive state for the UE. In a case that the access network configures the UE in the RRC-Inactive state, the corresponding configuration information is fed back to the core network, so that the core network performs the step of transmitting the request message for requesting the UE reachability information to the access network.

After the AMF entity receives an indication that the UE supports the RRC-Inactive state, if the AMF entity also receives a request message transmitted by other network element entities for requesting the UE reachability information, if the UE is currently in the CM-Connected state, the AMF entity transmits the request message for requesting the UE reachability information to the access network, requesting the access network to notify the actual reachability state of the UE.

In a case that the UE supports an RRC-Inactive state, the AMF entity of the core network of the embodiments of the present disclosure transmits a request message for requesting the UE reachability information to the access network if other network element entities request UE reachability information, so that the access network feeds back a specific RRC connection state according to the request message, so as to avoid that triggering the access network to transmit a paging message to a UE in the RRC-Inactive state during a process of initiating data transmission or service transmission from the core network to the UE, which effectively reduces air interface signaling and unnecessary power consumption of the RRC-Inactive UE.

The above embodiment describes the UE reachability management methods in different scenarios in detail, respectively, and the corresponding core network will be further described below with reference to the accompanying drawings.

Figure 3:
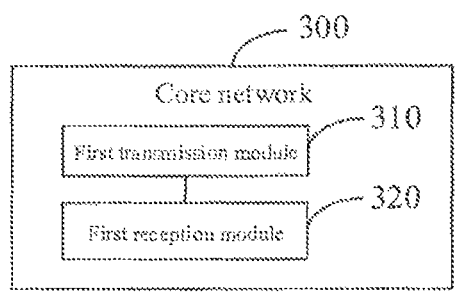
FIG. 3 is a schematic diagram illustrating modules of a core network according to an embodiment of the present disclosure.

As shown in FIG. 3, a core network 300 in the embodiment of the present disclosure may implement details of the method in the above embodiment: transmitting a request message for requesting UE reachability information to an access network in a case that a UE supports a radio resource control (RRC) inactive state; receiving the UE reachability information fed back by the access network according to the request message. The same effect may be achieved, and the core network 300 specifically includes the following functional modules:

a first transmission module 310, configured to transmit a request message for requesting UE reachability information to an access network in a case that a UE supports a radio resource control inactive (RRC-Inactive) state;

a first reception module 320, configured to receive the UE reachability information fed back by the access network according to the request message.

The first transmission module 310 includes:

a first transmission submodule, configured to transmit the request message for requesting the UE reachability information to the access network in a case that the AMF detected that the UE is in a connected management connected (CM-Connected) state.

The first transmission submodule includes:

a transmission unit, configured to transmit the request message for requesting the UE reachability information to the access network in a case that the AMF entity detected that other network element entity of the core network requests the UE reachability information and the UE is in the connected management connected (CM-Connected) state; where the other network element entity is a network element entity other than the AMF entity in the core network.

The first reception module 320 includes:
a first reception submodule, configured to receive the UE reachability information fed back by the access network, where the UE reachability information is configured to indicate that the UE is in an RRC-Connected state.

The first reception submodule includes:
a reception unit, configured to receive the UE reachability information that is fed back by the access network after the access network detects that the UE transitions from the RRC-Inactive state to the RRC-Connected state.

The core network 300 further includes:
a second reception module, configured to receive, through a non-access stratum (NAS) message, capability indication information configured to indicate whether the UE supports the RRC-Inactive state;
a first processing module, configured to transmit the request message for requesting the UE reachability information to the access network in a case that the capability indication information indicates that the UE supports the RRC-Inactive state.

The core network 300 further includes:
a third reception module, configured to receive information transmitted by the access network for activating the RRC-Inactive state for the UE;
a second processing module, configured to transmit the request message for requesting the UE reachability information to the access network according to the information.

It should be noted that, in a case that the UE supports an RRC-Inactive state, the AMF entity of the core network of the embodiments of the present disclosure transmits a request message for requesting the UE reachability information to the access network if other network element entities request UE reachability information, so that the access network feeds back a specific RRC connection state according to the request message, so as to avoid that triggering the access network to transmit a paging message to a UE in the RRC-Inactive state during a process of initiating data transmission or service transmission from the core network to the UE, which effectively reduces air interface signaling and unnecessary power consumption of the RRC-Inactive UE.

In order to better achieve the foregoing objective, an embodiment of the present disclosure further provides a core network including a storage and a processor, where a computer program executable by the processor is stored in the storage, and the computer program is executed by the processor to perform the UE reachability management method described as above.

An embodiment of the present disclosure further provides a computer readable storage medium, and a computer program is stored in the computer readable storage medium, where the computer program is executed by a processor to perform the UE reachability management method described as above.

The above embodiments introduce the method of the present disclosure from the core network side, and the present disclosure will further introduce the UE reachability management method on an access network side with reference to the accompanying drawings.

Figure 4:
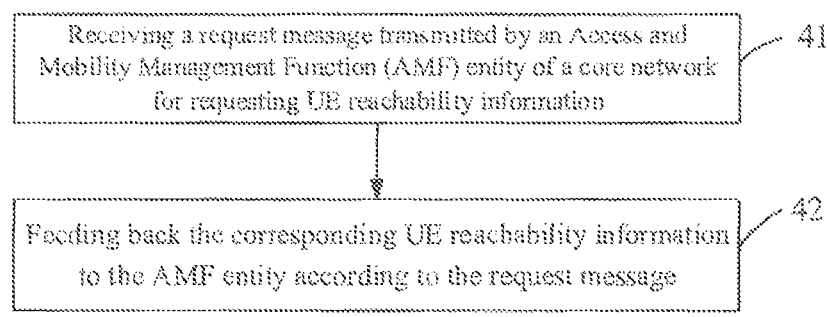
FIG. 4 is a schematic flowchart illustrating a UE reachability management method on an access network side according to an embodiment of the present disclosure.

As shown in FIG. 4, a UE reachability management method of the embodiment of the present disclosure is applied to an access network and specifically includes the following steps:

Step 41: receiving a request message transmitted by an Access and Mobility Management Function (AMF) entity of a core network for requesting UE reachability information.

In a 4G mobile communication system, the UE has an RRC-Connected state and an RRC-Inactive state. Since the UE is in the RRC-Connected state or the RRC-Inactive state, the AMF entity considers the UE to be in a CM-Connected state. In a case that the AMF entity needs to know the accurate connection state of the UE, the AMF entity needs to transmit a request message for requesting the UE reachability information to the access network. At this time, the access network receives the request message transmitted by the AMF entity of the core network.

Step 42: feeding back the corresponding UE reachability information to the AMF entity according to the request message.

After receiving the request message transmitted by the core network for requesting the UE reachability information, the access network feeds back the corresponding UE reachability information to the AMF entity. Specifically, in a case that the UE is in the RRC-Connected state, the UE reachability information configured to indicate the RRC-Connected state is fed back, and in a case that the UE is in the RRC-Inactive state, the UE reachability information configured to indicate the RRC-Inactive state is fed back.

Step 41 specifically includes: receiving the request message transmitted by the AMF entity of the core network for requesting the UE reachability information in a case that it is detected that the UE is in a connected management connected (CM-Connected) state. Specifically, since the UE is in an RRC-Idle state in a case that the UE is in a CM-IDLE state, the AMF entity transmits the request message for requesting the UE reachability information to the access network only in a case that it is detected that the UE is in the CM-Connected state.

Further, the above mentioned AMF entity transmits the request message to the access network in a case that accurate UE reachability information is required. Step 41 further includes: receiving the request message transmitted by the AMF entity of the core network for requesting the UE reachability information in a case that is the AMF entity detected that other network element entity of the core network requests the UE reachability information and the UE is in the connected management connected (CM-Connected) state. The other network element entity is a network element entity other than the AMF entity in the core network. Specifically, the accurate UE reachability information required by the AMF entity refers to the fact that the AMF entity receives the request message transmitted by other network element entities of the core network (such as a UDM entity or a Service Management Sub-Function (SMSF) entity, etc.) for requesting the UE reachability information.

Specifically, Step 42 includes: after receiving the request message, in a case that the UE is in an RRC-Connected state, feeding back, to the AMF entity, the UE reachability information configured to indicate that the UE is in the RRC-Connected state; and, after receiving the request message, in a case that the UE is in an RRC-Inactive state, tagging a UE reachability request parameter (URRP)-RAN in a context of the UE; after it is detected that the UE transitions from the RRC-Inactive state to an RRC-Connected state, feeding back, to the AMF entity, the UE reachability information configured to indicate the UE is in the RRC-Connected state, and clearing the URRP-RAN in the context of the UE. After the access network receives the request message, in a case that the UE is currently in the RRC-Connected state, the access network feeds back to the core network UE reachability information configured to indicate that the UE is in the RRC-Connected state. If the UE is currently in the RRC-Inactive state, the URRP-RAN is set in the context of the UE, and after the UE transitions from the RRC-Inactive state to the RRC-Connected state, the access network feeds back, to the AMF entity, the UE reachability information configured to indicate the UE is in the RRC-Connected state, and clear the URRP-RAN.

Further, prior to Step 41, the method further includes: activating an RRC-Inactive state for the UE, and generating corresponding information; transmitting the information to the AMF entity, to enable the AMF entity to transmit the request message for requesting the UE reachability information in a case that the UE supports the RRC-Inactive state.

Further, the NAS message in a UE registration request process carries capability indication information configured to indicate whether the UE supports the RRC-Inactive state, and the access network may transparently transmit the NAS message to the core network so that the core network knows whether the UE supports the RRC-Inactive state.

After receiving the request message transmitted by the AMF entity of the core network for requesting the UE reachability information in a case that the UE supports the RRC-Inactive state, the access network in the embodiment of the present disclosure feeds back a specific RRC connection state to the AMF entity of the core network according to the request message, so as to avoid that triggering the access network to transmit a paging message to a UE in the RRC-Inactive state during a process of service data transmission from the core network to the UE, which effectively reduces air interface signaling and unnecessary power consumption of the RRC-Inactive UE.

The above embodiment describes the UE reachability management methods in different scenarios, and the corresponding access network will be further described below with reference to the accompanying drawings.

Figure 5:
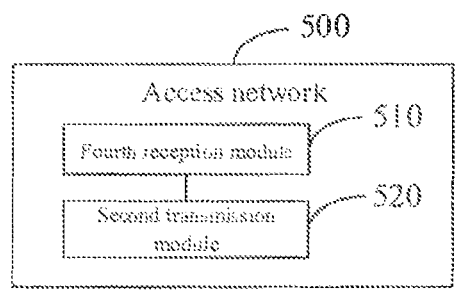
FIG. 5 is a schematic diagram illustrating modules of an access network according to an embodiment of the present disclosure.

As shown in FIG. 5, an access network 500 of an embodiment of the present disclosure may implement details of the method in the above embodiments: receiving a request message transmitted by an Access and Mobility Management Function (AMF) entity of a core network for requesting UE reachability information in a case that a UE supports a radio resource control inactive (RRC-Inactive) state; feeding back the corresponding UE reachability information to the AMF entity according to the request message. And the same effect may be achieved, the access network 500 specifically includes the following functional modules:

a fourth reception module 510, configured to receive a request message transmitted by an Access and Mobility Management Function (AMF) entity of a core network for requesting UE reachability information:

a second transmission module 520, configured to feed back the corresponding UE reachability information to the AMF entity according to the request message.

The fourth reception module 510 includes:

a fourth reception submodule, configured to receive the request message transmitted by the AMF entity for requesting the UE reachability information in a case that it is detected that the UE is in a connected management connected (CM-Connected) state.

The fourth reception submodule includes:

a reception unit, configured to receive the request message transmitted by the AMF entity of the core network for requesting the UE reachability information in a case that the AMF entity detected that other network element entity of the core network requests the UE reachability information and the UE is in the connected management connected (CM-Connected) state; where the other network element entity is a network element entity other than the AMF entity in the core network.

The fourth reception module 510 includes:

a fifth reception submodule, configured to receive a request message transmitted by an AMF entity of a core network for successively requesting UE reachability information N times, the N is an integer greater than or equal to 1.

The second transmission module 520 includes:

a first transmission submodule, configured to, after receiving the request message, in a case that the UE is in an RCC-Connected state, feed back, to the AMF entity, the UE reachability information configured to indicate that the UE is in the RRC-Connected state.

The second transmission module 520 further includes:

a tag submodule, configured to, after receiving the request message, in a case that the UE is in an RRC-Inactive state, tag a UE reachability request parameter URRP-RAN in a context of the UE;

a second transmission submodule, configured to, after it is detected that the UE transitions from the RRC-Inactive state to an RRC-Connected state, feed back, to the AMF entity, the UE reachability information configured to indicate the UE is in the RRC-Connected state, and clear the URRP-RAN in the context of the UE.

The access network 500 further includes:

an activation module, configured to activate an RRC-Inactive state for the UE, and generate corresponding information;

a third transmission module, configured to transmit the information to the AMF entity, to enable the AMF entity to transmit the request message for requesting the UE reachability information in a case that the UE supports the RRC-Inactive state.

It should be noted that, after receiving the request message transmitted by the AMF entity of the core network for requesting the UE reachability information in a case that the UE supports the RRC-Inactive state, the access network in the embodiment of the present disclosure feeds back a specific RRC connection state to the AMF entity of the core network according to the request message, so as to avoid that triggering the access network to transmit a paging message to a UE in the RRC-Inactive state in a process of service data transmission from the core network to the UE, which effectively reduces air interface signaling and unnecessary power consumption of the RRC-Inactive UE.

It should be noted that the division of each module of the above core network and the above access network is only a division of logical functions. In actual implementation, it may be integrated into one physical entity in whole or in part, or may be physically separated. And these modules can all be implemented in the form of software called by a processing component; or all of them can be implemented in the form of hardware; some modules can be implemented in the form of software called by a processing component, and some modules are implemented in the form of hardware. For example, the determination module may be a processing component set independently, or may be integrated in one chip of the above-mentioned devices, furthermore, or may be stored in the storage of the above device in the form of program code, the functions of the above determination module is called and executed by one processing component of the above device. The implementation of other modules is similar. In addition, all or part of these modules can be integrated or implemented independently. The processing components described herein can be an integrated circuit having a processing capability of signals. In the implementation process, each step of the above method or each of the above modules may be completed by an integrated logic circuit of hardware in the processor component or an instruction in a form of software.

For example, the above modules may be one or more integrated circuits configured to implement the above method, such as one or more Application Specific Integrated Circuits (ASICs), or one or more digital signal processors (DSPs), or, one or more Field Programmable Gate Arrays (FPGAs), etc. For another example, in a case that one of the above modules is implemented in the form of program codes scheduled by a processing component, the processing component may be a general purpose processor, such as a central processing unit (CPU) or other processor capable of calling the program codes. As another example, these modules can be integrated and implemented in the form of a 'system-on-a-chip (SOC).

In order to better achieve the foregoing objective, an embodiment of the present disclosure further provides an access network, including a storage and a processor, where a computer program executable by the processor is stored in the storage, and the computer program is executed by the processor to perform the UE reachability management method described as above. An embodiment of the present disclosure further provides a computer readable storage medium, and a computer program is stored in the computer readable storage medium, where the computer program is executed by a processor to perform the UE reachability management method described as above.

Figure 6:
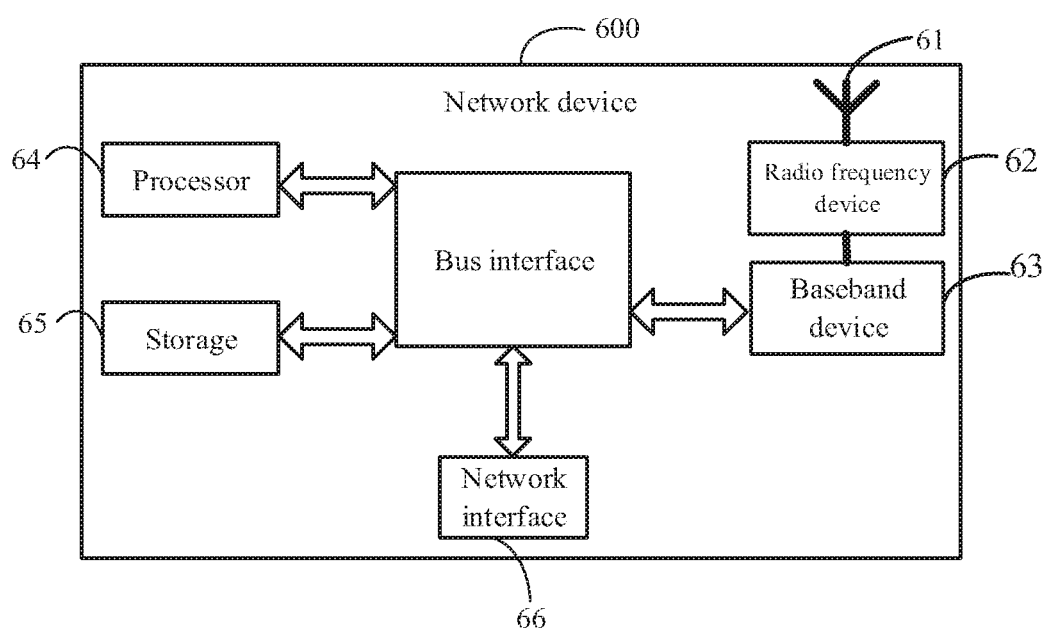
FIG. 6 is a block diagram of a network device according to an embodiment of the present disclosure.

Specifically, an embodiment of the present disclosure further provides a network device. As shown in FIG. 6, the network device 600 includes: an antenna 61, a radio frequency device 62, and a baseband device 63. The antenna 61 is connected to the radio frequency device 62. In an uplink direction, the radio frequency device 62 receives information via the antenna 61 and transmits the received information to the baseband device 63 for processing. In a downlink direction, the baseband device 63 processes the information to be transmitted and transmits it to the radio frequency device 62, and the radio frequency device 62 processes the received information and transmits it via the antenna 61.

The above-described frequency band processing device may be located in the baseband device 63, and the method performed by the network device in the above embodiment may be implemented in the baseband device 63, and the baseband device 63 includes a processor 64 and a storage 65.

The baseband device 63 may include, for example, at least one baseband board on which a plurality of chips are disposed, as shown in FIG. 6, one of which is, for example, a processor 64, coupled to the storage 65 to call a program in the storage 65 to perform operation of the network device shown in the above method embodiment.

The baseband device 63 may further include a network interface 66 for interacting with the radio frequency device 62, and the interface is, for example, a common public wireless interface (CPRI).

The processor herein may be one processor or a collective name of multiple processing elements. For example, the processor may be a CPU, an ASIC, or one or more integrated circuits configured to implement the methods performed by the above network devices, such as one or more digital signal processors (DSPs), or one or more field programmable gate arrays (FPGAs), and the like. The storage element can be a storage or a collective name for multiple storage elements.

It is to be understood that the storage 65 in this disclosure may be either a volatile storage or a non-volatile storage, or can include both the volatile and the non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchronous link DRAM (SLDRAM) and a Direct Rambus RAM (DRRAM). The storage 65 described herein is intended to include, but is not limited to, these and any other suitable types of storage.

Specifically, the network device of the embodiment of the present disclosure further includes: a computer program stored in the storage 65 and executable on the processor 64. The processor 64 calls the computer program in the storage 65 to execute the method executed by each module shown in FIG. 3.

Specifically, the computer program is called by the processor 64 to implement: transmitting a request message for requesting UE reachability information to an access network in a case that a UE supports a radio resource control (RRC) inactive state; receiving the UE reachability information fed back by the access network according to the request message.

Specifically, the computer program is called by the processor 64 to implement: transmitting the request message for requesting the UE reachability information to the access network in a case that the AMF entity detected that the UE is in a connected management connected (CM-Connected) state.

Specifically, the computer program is called by the processor 64 to implement: transmitting the request message for requesting the UE reachability information to the access network in a case that the AMF entity detected that other network element entity of the core network requests the UE reachability information and the UE is in the connected management connected (CM-Connected) state; where the other network element entity is a network element entity other than the AMF entity in the core network.

Specifically, the computer program is called by the processor 64 to implement: receiving the UE reachability information fed back by the access network, wherein the UE reachability information is configured to indicate that the UE is in an RRC-Connected state.

Specifically, the computer program is called by the processor 64 to implement: receiving the UE reachability information that is fed back by the access network after the access network detects that the UE transitions from the RRC-Inactive state to the RRC-Connected state.

Specifically, the computer program is called by the processor 64 to implement: receiving, through a non-access stratum (NAS) message, capability indication information configured to indicate whether the UE supports the RRC-Inactive state;

transmitting the request message for requesting the UE reachability information to the access network in a case that the capability indication information indicates that the UE supports the RRC-Inactive state.

Specifically, the computer program is called by the processor 64 to implement: receiving information transmitted by the access network for activating the RRC-Inactive state for the UE;

performing the step of transmitting the request message for requesting the UE reachability information to the access network according to the information.

In a case that the UE supports an RRC-Inactive state, the AMF entity of the core network of the embodiments of the present disclosure transmits a request message for requesting the UE reachability information to the access network if other network element entities request UE reachability information, so that the access network feeds back a specific RRC connection state according to the request message, so as to avoid that triggering the access network to transmit a paging message to a UE in the RRC-Inactive state during a process of service data transmission from the core network to the UE, which effectively reduces air interface signaling and unnecessary power consumption of the RRC-Inactive UE.

In addition, the processor 64 of the network device of the embodiment of the present disclosure calls the computer program in the storage 65 to implement the method implemented by each module shown in FIG. 5.

Specifically, the computer program is called by the processor 64 to implement: receiving a request message transmitted by an Access and Mobility Management Function (AMF) entity of a core network for requesting UE reachability information;

feeding back the corresponding UE reachability information to the AMF entity according to the request message.

Specifically, the computer program is called by the processor 64 to implement: receiving the request message transmitted by the AMF entity of the core network for requesting the UE reachability information in a case that it is detected that the UE is in a connected management connected (CM-Connected) state.

Specifically, the computer program is called by the processor 64 to implement: receiving the request message transmitted by the AMF entity of the core network for requesting the UE reachability information in a case that the AMF entity detected that other network element entity of the core network requests the UE reachability information and the UE is in the connected management connected (CM-Connected) state; where the other network element entity is a network element entity other than the AMF entity in the core network.

Specifically, the computer program is called by the processor 64 to implement: after receiving the request message, in a case that the UE is in an RCC connected state, feeding back, to the AMF entity, the UE reachability information configured to indicate that the UE is in the RRC-Connected state;

Specifically, the computer program is called by the processor 64 to implement: after receiving the request message, in a case that the UE is in an RRC-Inactive state, tagging a UE reachability request parameter URRP-RAN in a context of the UE;

after it is detected that the UE transitions from the RRC-Inactive state to an RRC-Connected state, feeding back, to the AMF entity, the UE reachability information configured to indicate the UE is in the RRC-Connected state, and clearing the URRP-RAN in the context of the UE.

Specifically, the computer program is called by the processor 64 to implement: activating an RRC-Inactive state for the UE, and generate corresponding information;

transmitting the information to the AMF entity, to enable the AMF entity to transmit the request message for requesting the UE reachability information in a case that the UE supports the RRC-Inactive state.

After receiving the request message transmitted by the AMF entity of the core network for requesting the UE reachability information in a case that the UE supports the RRC-Inactive state, the access network in the embodiment of the present disclosure feeds back a specific RRC connection state to the AMF entity of the core network according to the request message, so as to avoid that triggering the access network to transmit a paging message to a UE in the RRC-Inactive state during a process of service data transmission from the core network to the UE, which effectively reduces air interface signaling and unnecessary power consumption of the RRC-Inactive UE.

A person skilled in the art may be aware that, the exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art can use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the mutual coupling or direct coupling or communication connection shown or discussed may be an indirect coupling or a communication connection through some interface, device or unit, and may be in an electrical, mechanical or other form.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, various functional units in various embodiments of the present disclosure may be integrated into one processing unit, or each of the units may exist alone physically, or two or more units may be integrated into one unit.

If the function is implemented in form of software functional unit and sold or used as an independent product, it may be stored in a computer readable storage medium. Based on such an understanding, essential part or the part contributing to the prior art of the technical solutions of the present disclosure, or a part of the technical solutions may be implemented in form of a software product. The computer software product is stored in a storage medium, and includes several instructions for instructing a computer device (which may be a personal computer, a server, or a network device, etc.) to perform all or a part of the steps of the methods described in the embodiments of the disclosure. The foregoing storage medium includes various media that can store program codes, such as a USB flash drive, a mobile hard disk, a ROM, a RAM, a magnetic disk, or an optical disk, etc.

In addition, it should be noted that in the device and method of the present disclosure, it is apparent that various components or various steps may be decomposed and/or recombined. The decomposition and/or recombination should be considered as equivalents to the present disclosure. Also, the steps of performing the above-described series of processes may naturally be performed in chronological order in the order illustrated, but not necessarily be required to be performed in chronological order, and some steps may be performed in parallel or independently of each other. It will be appreciated by those skilled in the art that all or any of the steps or components of the methods and devices of the present disclosure may be implemented in any computing device (including a processor, a storage medium, etc.) or any computing device network through hardware, firmware, software, or a combination thereof, which may be implemented by the ordinary skill in the art using their basic programming skills after they read the description of the present disclosure.

Accordingly, the objects of the present disclosure may also be achieved by running a program or a set of programs on any computing device. The computing device may be a well-known general purpose device. Accordingly, the objects of the present disclosure may also be realized by merely providing a program product including program code for implementing the method or device. That is to say, such a program product also constitutes the present disclosure, and a storage medium storing such a program product also constitutes the present disclosure. It will be apparent that the storage medium may be any known storage medium or any storage medium developed in the future. In addition, it should be noted that in the device and method of the present disclosure, it is apparent that various components or various steps may be decomposed and/or recombined. The decomposition and/or recombination should be considered as equivalents to the present disclosure. Also, the steps of performing the above-described series of processes may naturally be performed in chronological order in the order illustrated, but not necessarily be required to be performed in chronological order. Certain steps may be performed in parallel or independently of one another.

The descriptions above are some embodiments of the disclosure, it should be noted that the improvements and the embellishments within the scope of the tenets of the disclosure shall be within the scope of the disclosure to those of ordinary skill in the art.

What is claimed is:

1. A User Equipment (UE) reachability management method, comprising:
    transmitting, by an Access and Mobility Management Function (AMF) entity of a core network, a request message for requesting UE reachability information to an access network in a case that a UE supports a radio resource control inactive (RRC-Inactive) state and the AMF entity detected that the UE is in a connected management connected (CM-Connected) state;
    receiving, by the AMF entity, the UE reachability information fed back by the access network according to the request message; wherein when the UE is in the RRC-Connected state, the UE reachability information indicates that the UE is in the RRC-Connected state, and when the UE is in the RRC-Inactive state, the UE reachability information indicates that the UE is in the RRC-Inactive state;
    not transmitting, by the AMF, a request message for requesting UE reachability information to the access network in a case that the AMF entity detected that the UE is in a connected management idle (CM-Idle) state.

2. The UE reachability management method according to claim 1, wherein transmitting by the AMF entity of the core network the request message for requesting UE reachability information to the access network in the case that the UE supports the radio resource RRC-inactive state and the AMF entity detected that the UE is in the CM-Connected state comprises:
    transmitting the request message for requesting the UE reachability information to the access network in a case that the AMF entity detected that other network element entity of the core network requests the UE reachability information and the UE is in the CM-Connected state;
    wherein the other network element entity is a network element entity other than the AMF entity in the core network.

3. The UE reachability management method according to claim 1, further comprising:
    prior to the transmitting the request message for requesting the UE reachability information to the access network, receiving, through a non-access stratum (NAS) message, capability indication information configured to indicate whether the UE supports the RRC-Inactive state;
    transmitting the request message for requesting the UE reachability information to the access network in a case that the capability indication information indicates that the UE supports the RRC-Inactive state.

4. The UE reachability management method according to claim 1, further comprising:
    prior to the transmitting the request message for requesting the UE reachability information to the access network, receiving information transmitted by the access network for activating the RRC-Inactive state for the UE;
    transmitting the request message for requesting the UE reachability information to the access network according to the information.

5. A core network, comprising a processor and a storage, wherein a computer program executable by the processor is stored in the storage, and the computer program is executed by the processor:
    transmitting, by an Access and Mobility Management Function (AMF) entity of a core network, a request message for requesting UE reachability information to an access network in a case that a UE supports a radio resource control inactive (RRC-Inactive) state and the AMF entity detected that the UE is in a connected management connected (CM-Connected) state;
    receiving, by the AMF entity, the UE reachability information fed back by the access network according to the request message; wherein when the UE is in the RRC-Connected state, the UE reachability information is configured to indicate that the UE is in the RRC-Connected state, and when the UE is in the RRC-Inactive state, the UE reachability information is configured to indicate that the UE is in the RRC-Inactive state;

not transmitting, by the AMF, a request message for requesting UE reachability information to the access network in a that the AMF entity detected that the UE is in a connected management idle (CM-Idle) state.

6. The core network according to claim 5, wherein the computer program is executed by the processor to perform:
transmitting the request message for requesting the UE reachability information to the access network in a case that the AMF entity detected that other network element entity of the core network requests the UE reachability information and the UE is in the CM-Connected state; wherein the other network element entity is a network element entity other than the AMF entity in the core network.

7. The core network according to claim 5, wherein the computer program is executed by the processor to perform:
prior to the transmitting the request message for requesting the UE reachability information to the access network, receiving, through a non-access stratum (NAS) message, capability indication information configured to indicate whether the UB supports the RRC-Inactive state;
transmitting the request message for requesting the UE reachability information to the access network in a case that the capability indication information indicates that the UE supports the RRC-Inactive state.

8. The core network according to claim 5, wherein the computer program is executed by the processor to perform:
prior to the transmitting the request message for requesting the UE reachability information to the access network, receiving information transmitted by the access network for activating the RRC-Inactive state for the UE;
transmitting the request message for requesting the UB reachability information to the access network according to the information.

9. A User Equipment (UE) reachability management method, applied to an access network, comprising:
receiving a request message transmitted by an Access and Mobility Management Function (AMF) entity of a core network for requesting UE reachability information in a case that a UE supports a radio resource control inactive (RRC-Inactive) state and the AMF entity detected that the UE is in a connected management connected (CM-Connected) state;
feeding back the corresponding UE reachability information to the AMF entity according to the request message; wherein when the UE is in the RRC-Connected state, the UE reachability information is configured to indicate that the UE is in the RRC-Connected state, and when the UE is in the RRC-Inactive state, the UE reachability information is configured to indicate that the UE is in the RRC-n active state.

10. The UE reachability management method according to claim 9, wherein the receiving the request message transmitted by the AMF) entity of the core network for requesting UE reachability information in a ease that the UE supports the RRC-Inactive state and the AMF entity detected that the UE is in the CM-Connected state comprises:
receiving the request message transmitted by the AMF entity for requesting the UE reachability information in a ease that the AMF entity detected that other network element entity of the core network requests the UE reachability information and the UE is in the connected management connected (CM-Connected) state; wherein the other network element entity is a network element entity other than the AMF entity in the core network.

11. The UE reachability management method according to claim 9, wherein
after receiving the request message, in a case that the UE is in an RRC-Inactive state, the method further comprises:
tagging a UE reachability request parameter URRP-RAN in a context of the UE; and
subsequent to the feeding back the UE reachability information to the AMF entity according to the request message after the access network detects that the UE transitions from the RRC-Inactive state to the RRC-Connected state, the method further comprises:
clearing the URRP-RAN in the context of the UE.

12. The UE reachability management method according to claim 9, further comprising:
prior to the receiving the request message transmitted by the Access and Mobility Management Function (AMF) entity of the core network for requesting the UE reachability information, activating an RRC-Inactive state for the UE, and generating corresponding information;
transmitting the information to the AMF entity, to enable the AMF entity to transmit the request message for requesting the LIE reachability information in a case that the UE supports the RRC-Inactive state.

13. An access network, comprising a processor and a storage, wherein a computer program executable by the processor is stored in the storage, and the computer program is executed by the processor to perform the UE reachability management method according to claim 9.

* * * * *